US012692104B2

(12) United States Patent
Mackintosh et al.

(10) Patent No.: US 12,692,104 B2
(45) Date of Patent: Jul. 28, 2026

(54) WHEELBARROW LIFT FOR DUMPSTER

(71) Applicants: Eric Mackintosh, Tyler, TX (US); Heath Hicks, Tyler, TX (US)

(72) Inventors: Eric Mackintosh, Tyler, TX (US); Heath Hicks, Tyler, TX (US)

( * ) Notice: Subject to any disclaimer, the term of this patent is extended or adjusted under 35 U.S.C. 154(b) by 118 days.

(21) Appl. No.: 18/660,425

(22) Filed: May 10, 2024

(65) Prior Publication Data
US 2024/0294344 A1 Sep. 5, 2024

Related U.S. Application Data

(63) Continuation-in-part of application No. PCT/US2023/086189, filed on Dec. 28, 2023.

(60) Provisional application No. 63/435,841, filed on Dec. 29, 2022.

(51) Int. Cl.
*B65G 67/46* (2006.01)
*B65G 47/44* (2006.01)

(52) U.S. Cl.
CPC ............. *B65G 67/46* (2013.01); *B65G 47/44* (2013.01); *B65G 2814/0379* (2013.01)

(58) Field of Classification Search
CPC ................... B65G 65/23; B65G 67/02; B65G 2814/0379; B65F 1/1452; B65F 3/08; B66F 9/02–04
See application file for complete search history.

(56) References Cited

U.S. PATENT DOCUMENTS 3,282,453 A * 11/1966 Wood ........................ B60P 1/50
414/409

4,219,298 A * 8/1980 Stragier .................... B65F 3/08
414/544
4,313,707 A * 2/1982 Bingman .................. B65F 3/08
414/544
4,921,385 A 5/1990 Okuno
5,205,698 A * 4/1993 Mezey ..................... B65F 3/04
414/409

(Continued)

FOREIGN PATENT DOCUMENTS

CN 111217045 A 6/2020
GB 2427603 A 1/2007
WO WO2005102811 A1 11/2005

OTHER PUBLICATIONS

Wheelbarrow Dumping Machine, https://www.youtube.com/watch?v=oBxGHWWmfLM, Evaluation based on paper entry figure. URL no longer available.

(Continued)

*Primary Examiner* — Joseph A Dillon, Jr.
(74) *Attorney, Agent, or Firm* — Standley Law Group LLP; F. Michael Speed, Jr.; Adam J. Smith

(57) ABSTRACT

An apparatus for docking with, lifting, and depositing debris from, a wheelbarrow into a dumpster along with related systems and methods. The apparatus includes a pair of tracks, a lower portion of which extend longitudinally in a primarily vertical direction, and an upper portion of which extending longitudinally rearward in a curve shape to hook over an upper opening of the dumpster when installed. A vehicle includes wheels which engage the tracks and a docking portion which receives, and frictionally engages upon lifting, a portion of the wheelbarrow so that it may be lifted and its debris contained therein deposited into the dumpster.

16 Claims, 11 Drawing Sheets

(56) References Cited

U.S. PATENT DOCUMENTS

| | | | | |
|---|---|---|---|---|
| 5,230,393 | A * | 7/1993 | Mezey | B65F 3/08 |
| | | | | 177/139 |
| 5,344,273 | A * | 9/1994 | Radlein | B65F 3/201 |
| | | | | 414/407 |
| 5,725,348 | A * | 3/1998 | Drake | B65F 3/046 |
| | | | | 414/408 |
| 5,934,867 | A | 8/1999 | Christenson | |
| 6,474,929 | B1 | 11/2002 | Hartman | |
| 6,494,665 | B1 * | 12/2002 | Bingman | B65F 3/08 |
| | | | | 414/409 |
| 6,644,907 | B1 * | 11/2003 | Pinder | B66F 9/19 |
| | | | | 414/424 |
| 7,273,340 | B2 | 9/2007 | Arrez et al. | |
| 7,871,233 | B2 | 1/2011 | Arrez et al. | |
| 8,444,166 | B1 | 5/2013 | Jarvis | |
| 9,089,147 | B2 * | 7/2015 | Maile | A22C 11/02 |
| 9,248,850 | B1 | 2/2016 | Romas et al. | |
| 9,561,904 | B1 | 2/2017 | Osborn | |
| 9,969,574 | B2 | 5/2018 | Robert | |
| 10,301,111 | B2 * | 5/2019 | Schell | B65F 3/08 |
| 10,919,696 | B2 * | 2/2021 | Schell | B65F 3/043 |
| 10,961,095 | B2 * | 3/2021 | Hitchcock | B66F 9/02 |
| 10,994,929 | B2 | 5/2021 | Haddick et al. | |
| 11,492,196 | B2 * | 11/2022 | Pung | B65F 1/1468 |
| 12,139,329 | B2 * | 11/2024 | Buege | B65F 3/08 |
| 12,145,797 | B1 * | 11/2024 | Bonerb | B65F 3/10 |
| 2008/0084038 | A1 | 4/2008 | Byers | |
| 2019/0344964 | A1 | 11/2019 | Schell | |
| 2022/0180330 | A1 * | 6/2022 | Dietrich | G06T 7/70 |
| 2024/0294343 | A1 * | 9/2024 | Fleming | B65G 65/23 |
| 2025/0026563 | A1 * | 1/2025 | Buege | B65F 3/08 |
| 2025/0153930 | A1 * | 5/2025 | Law | B65F 1/10 |
| 2025/0197141 | A1 * | 6/2025 | Mackintosh | B65F 1/1452 |

OTHER PUBLICATIONS

TCD-M Manual & Electric Hydraulic Trash Can Dumpers, https://www.youtube.com/watch?v=y_1QALvk44o.

Wheelbarrow Lift and Dumping Machine, https://tuku-singapore.com/wheelbarrow-dumping/, Dec. 29, 2022.

Handtrucks2GO Hand Trucks Aluminum Hand Trucks Powered Dump Dolly EZ-Latch Garbage Can Hand Truck Lift, https://handtrucks2go.com/Powered-Dump-Dolly-EZ-Latch-Garbage-Can-Hand-Truck-Lift-94-Tall.html, Dec. 29, 2022.

All Safety Hoist Products, https://safetyhoistcompany.com/collections/all-products, May 10, 2024.

* cited by examiner

WHEELBARROW LIFT FOR DUMPSTER

CROSS-REFERENCE TO RELATED APPLICATIONS

This application is a continuation-in-part of PCT/US2023/086189 filed internationally on Dec. 28, 2023, which claims the benefit of U.S. Provisional Application Ser. No. 63/435,841 filed Dec. 29, 2022, the disclosures of which are hereby incorporated by reference as if fully rested herein.

TECHNICAL FIELD

Exemplary embodiments relate generally to a wheelbarrow lift for a dumpster, as well as related systems and methods.

BACKGROUND AND SUMMARY OF THE INVENTION

Wheelbarrows are sometimes used to load debris or other materials, such as waste, at a job site. Such material is sometimes deposited into a dumpster, such as by manually transferring the material by hand or shovel. This effort is relatively labor intensive as it generally involves repeatedly lifting relatively small quantities of the material a significant distance. Alternatively, a forward portion or door into the dumpster is opened to deposit material, but this prevents the full space of the dumpster from being utilized, else the material will spill out. What is needed is a device for assisting with deposit of material from a wheelbarrow into a dumpster.

A wheelbarrow lift for a dumpster or other container and related systems and methods are provided. A lift may be provided at the dumpster or other container. A wheelbarrow may be loaded with waste material and docked with the lift. For example, without limitation, the lift may include a platform with an opening shaped to accommodate and secure a tub of the wheelbarrow. However, the platform may be adapted to accommodate other types or kinds of wheelbarrows or other material transportation vehicles. The platform with the docked wheelbarrow may be lifted, such as by way of one or more motors, along the track which may vertically raise and rotate the platform and docked wheelbarrow to dump the waste material into the dumpster. The wheelbarrow may be lowered so that it may be undocked and reloaded. In this fashion, material deposited in wheelbarrows may be quickly and efficiently transferred to a dumpster.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
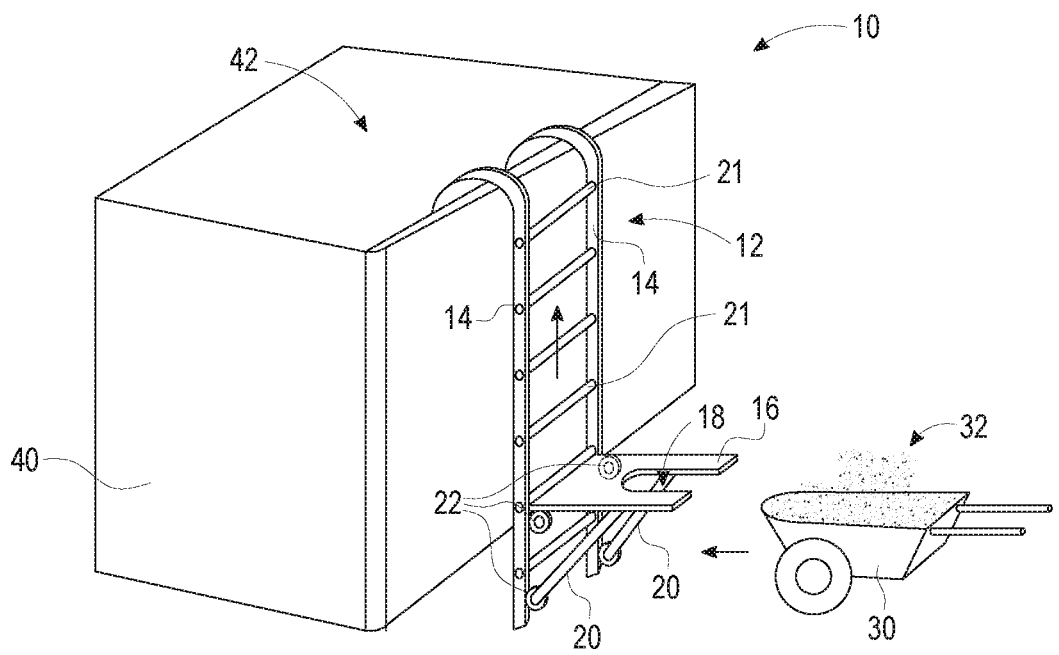
FIG. 1 is a perspective view of a dumpster deposit system with a loaded wheelbarrow being docked.

FIG. 1 illustrates an exemplary system 10 for depositing debris 32 from a wheelbarrow 30 into a dumpster 40. The system 10 may comprise a lift 12. The lift 12 may be independent from, and removably attachable to, the dumpster 40. For example, without limitation, the lift 12 may comprise one or more tracks 14. At least an upper portion of the tracks 14 may be configured to hook over an upper edge of the dumpster 40, such as to be secured by gravitational and/or frictional forces. A relatively high friction material (e.g., rubber) may be provided on the undersides of the tracks 14. Alternatively, the lift 12 may be permanently or semi-permanently attached to the dumpster 40. For example, without limitation, one or more portions of the tracks 14 may be clamped, welded, fastened, or otherwise secured to one or more walls of the dumpster 40.

The tracks 14 may comprise vertically extending portions, which may extend vertically along a forward wall of the dumpster 40, by way of non-limiting example. The vertically extending portions of the tracks 14 may extend an entire or partial vertical height of the dumpster. For example, they may extend to or near a bottom surface of the dumpster 40, which is presumably adjacent to a ground surface, or be spaced apart therefrom. The upper portions of the tracks 14 may be configured to hook or otherwise extend over an upper wall or portion of the dumpster 40, such as into an upper or other opening 42 thereof. Two tracks 14 may be provided. The tracks 14 may be spaced apart from one another and may extend substantially or entirely parallel to one another, such as at a fixed spacing. Any number, type, and/or arrangement of tracks 14 may be utilized. The tracks 14 may be sized and/or configured to accommodate various size, shape and/or type dumpsters 40, such as with various size, shape, number, type, and/or location of opening 42.

The lift 12 may comprise a docking portion 16. The docking portion 16 may comprise one or more platforms or other surfaces. The docking portion 16 may comprise one or more docking apertures 18. The docking portion 16 may be configured to permit horizontal movement of the wheelbarrow 30 along a ground surface for securement within the aperture 18 when the docking portion 16 is at a first, lowered position, by way of non-limiting example.

The apertures 18 may be provided, such as in the platforms or other surfaces, and may be sized, shaped, and/or otherwise configured to accommodate a portion of the wheelbarrow 30. In exemplary embodiments, without limitation, the aperture 18 may be sized such as to receive a tub portion of the wheelbarrow 30. The aperture 18 may be sized such that the wheelbarrow 30 is frictionally engaged as the docking portion 16 is raised relative to the wheelbarrow 30. For example, without limitation, conventionally, the upper portions of a wheelbarrow 30 tub are larger than the lower portions, thus the aperture 18 may be sized to fit at a middle and/or upper portion of the tub for the wheelbarrow 30 while preventing the wheelbarrow 30 from slipping therethrough. The aperture 18 may be lined with a cushioned and/or grippy material, such as but not limited to foam or rubber.

Other size and shape apertures 18 may be provided for other size, shape, and/or types of wheelbarrows 30 or other material transport vehicles. The aperture 18 may be configured to provide a snug fit to the wheelbarrows 30 or other material transport vehicles and may be configured to prevent vertical and/or limited lateral movement (e.g., in a particular direction or without significant outside forces) of the wheelbarrows 30 or other material transport vehicles when secured at the apertures 18. For example, the aperture 18 may be configured to allow the wheelbarrows 30 or other material transport vehicles to be moved laterally into or out of the aperture 18 but prevent vertical movement and movement in a forward direction when docked. In this fashion, the wheelbarrows 30 or other material transport vehicles may be lifted and/or rotated vertically (or beyond vertically) to dump the material 32 without undocking.

The docking portion 16 may comprise one or more secondary securing devices, such as but not limited to, clips, straps, clamps, wheel blocks, wheel grooves, fasteners, combinations thereof, or the like for securing or further securing the wheelbarrow 30 or other material transport vehicles to the docking portion 16. Any type, kind, number, and/or arrangement of such secondary securing devices may be utilized for any type and/or kind of wheelbarrow 30 or other material transport vehicle.

The docking portion 16 may be secured to the tracks 14 by way of wheels 22, such as to permit movement of the docking portion 16 along the tracks 14.

The docking portion 16 may comprise one or more support members 20. The support members 20 may provide structural rigidity to the docking portion 16. Wheels 22 may be provided at the support members 20, though such is not required. The wheels 22 may ride within interior facing side portions of the tracks 14, exterior facing side portions of the track, front facing exterior portions of the tracks 14, combinations thereof, or the like. In this way, the tracks 14 may act like rails which guide and/or constrain wheel 22 movement. The wheels 22 and/or tracks 14, for example without limitation, may be adapted to mutually receive and/or constrain one another (e.g., corresponding protrusions and grooves). Any number, size, type, and/or arrangement of support member 20 may be utilized. Any number, size, type, and/or arrangement of wheels 22 may be utilized.

One or more cross supports 21 may extend between the tracks 14 for added support. The cross supports 21 may be located near a rear of the track 14, in exemplary embodiments without limitation, such as to accommodate the wheels 22. Other arrangements for accommodating the wheels 22 may be utilized. Any number, size, type, and/or arrangement of cross supports 21 may be utilized.

The dumpster 40 may be configured for lifting and dumping itself, such as when it is full or otherwise in need of emptied.

Figure 2:
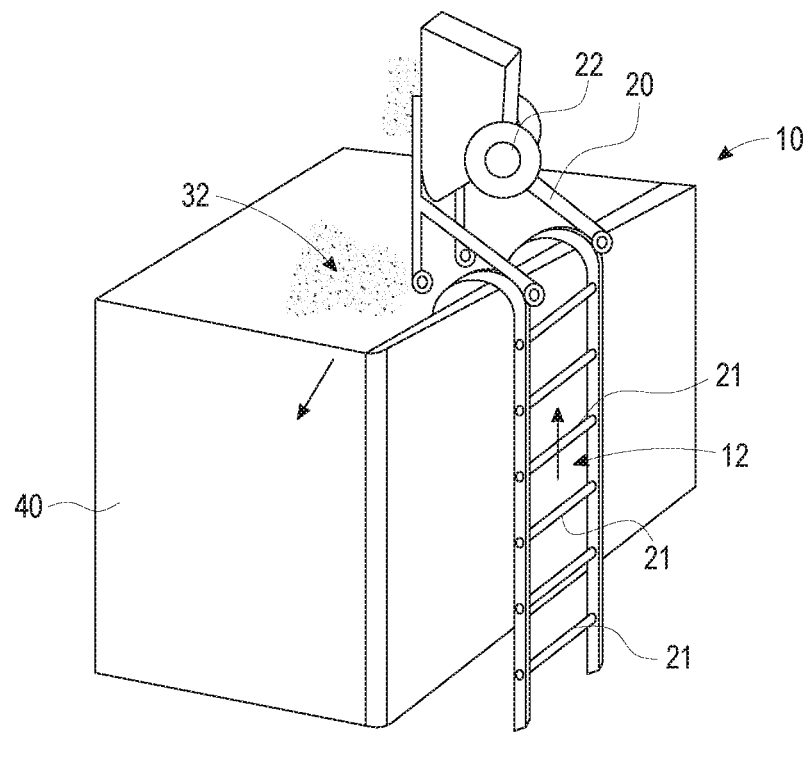
FIG. 2 is the system of FIG. 1 with the docked wheelbarrow vertically raised and rotated and dumping the debris into a dumpster.

FIG. 2 illustrates the system 10 with a wheelbarrow 30 docked, raised, and rotated to deposit debris 32 into the dumpster 40. The vertically extending portions of the track(s) 14 may be configured to permit vertical raising of the wheelbarrow 30 when docked. The curved upper portions of the track(s) 14 may be configured to force rotation of the wheelbarrow 30, such as to a vertical (~90°), near vertical (e.g., between about 65-90°), or beyond vertical (e.g., between about 90°-180°), when raised to deposit the debris 32 within the dumpster 40. In this fashion, the material 32 is dumped forward out of the wheelbarrow 30.

Any shape or arrangement of the tracks 14 may be utilized. For example, without limitation, the tracks 14 may be configured to provide a full or partial barrel roll type inversion to the wheelbarrow 30, a side dump, combinations thereof, or the like.

Alternatively, or additionally, the docking portion 16 may comprise one or more mechanisms for lifting the wheelbarrow 30 to dump the material 32 once the docking portion 16 is raised. Such mechanisms may include, for example without limitation, ramps, pistons, hinges, pulleys, or the like for tilting the wheelbarrow 30, which remains otherwise secured.

Figure 7:
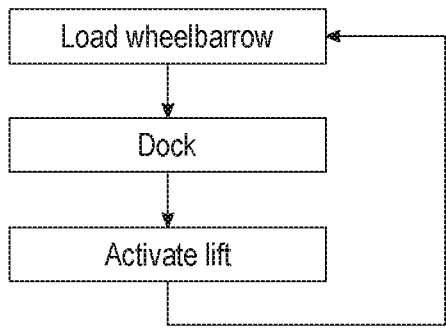
FIG. 7 is a flow chart with exemplary logic for operating the system and/or lift of FIGS. 1-6.

As demonstrated in at least FIG. 7, the wheelbarrow 30 may be subsequently returned to a lowered position to be undocked and refilled.

While wheelbarrows 30 may be shown and/or described in certain instances, other types and/or kinds of vehicles for material transportation may be utilized, which are configured to manual and/or automatic movement, such as but not limited to wagons, hand carts, trolleys, combinations thereof, or the like. Elements of the lift 12 may be adapted to accommodate such vehicles, such as by providing an appropriately sized, shaped, and/or otherwise configured platforms or other surfaces of the docking portion 16. For example, without limitation, the docking portion may comprise one or more flat surfaces for rolling the vehicles onto and/or securing the vehicle. Alternatively, or additionally, the docking portion 16 may comprise one or more containers and the debris 32 may be manually dumped into the container by the wheelbarrow 30 or other vehicle for lifting.

While dumpsters 40 may be shown and/or described in certain instances, other types and/or kinds of waste receptacles may be utilized. Elements of the lift 12 may be adapted to accommodate such waste receptacles, such as by providing appropriately sized, shaped, and/or otherwise configured track(s) 14.

Figures 3, 4, 5:
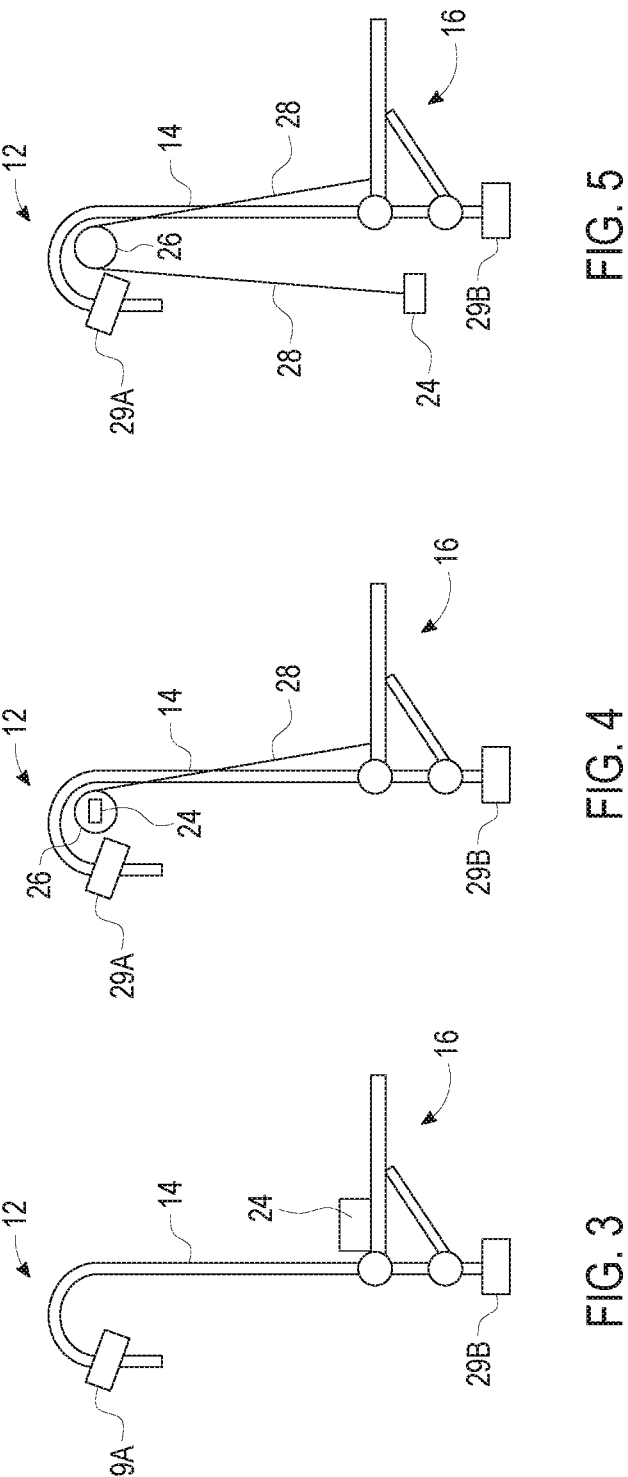
FIG. 3 is a side view of the lift of FIGS. 1-2 illustrated in isolation.
FIG. 4 is a side view of another exemplary embodiment of the lift of FIGS. 3.
FIG. 5 is a side view of another exemplary embodiment of the lift of FIGS. 3.

FIG. 3 illustrates an exemplary embodiment of the lift 12. The lift 12 may comprise one or more stoppers 29. A first set of one or more stoppers 29A may be positioned along or at an upper portion of the track(s) 14 to prevent movement of the docking portion 16 beyond a first end of the track 14. A respective one of the first set of stoppers 29A may be provided at each of the tracks 14. A second set of one or more stoppers 29B may be positioned along or at a lower portion of the track(s) 14 to prevent movement of the docking portion 16 beyond a second end of the track 14. A respective one of the second set of stoppers 29B may be provided at each of the tracks 14.

The stoppers 29 may comprise blocks, crimped track ends, combinations thereof, or the like. Any number, type, and/or placement of stoppers 29 may be utilized. The use of stoppers 29 is optional. For example, the docking portion 16 may be otherwise electronically controlled to prevent movement beyond the tracks 14.

One or more motors 24 may be provided at the docking portion 16. The motors 24 may be configured to directly or indirectly (e.g., by drive shafts, gears, chains, cams, linkages, ropes, wires, combination thereof, or the like) drive the wheels 22. A respective motor 24 may be provided for each respective wheel 22 and/or a common motor 24 may be provided for multiple wheels 22. Some or all wheels 22 may be motorized.

FIG. 4 illustrates another exemplary embodiment of the lift 12 whereby one or more flexible linkages 28, such as but not limited to, rope, wire, cable, chain, combinations thereof, or the like, are attached to the docking portion 16 and connected to a movement redirection component 26, such as but not limited to a gear, pulley, block, tackle, spool, combination thereof, or the like. The movement redirection component 26 may be configured for motorized operation by a motor 24. Multiple flexible linkages 28, movement redirection component 26 and/or motors 24 may be utilized. Intervening components such as but not limited to levers, gears, cams, pulleys, combination thereof, or the like may be utilized, such as to provide mechanical advantages. The redirection component 26 may be provided with the motor 24, such as to form and/or as part of a winch, by way of non-limiting example.

FIG. 5 illustrates another exemplary embodiment of the lift 12 whereby the one or more flexible linkages 28 may extend about some or all of the movement redirection component(s) 26 to a ground surface where the motor 24 is provided.

A single or multiple motors 24, movement redirection components 26, flexible linkages 28, combinations thereof, or the like may be utilized together and/or separately such as to provide additional power, capacity, and/or mechanical advantage.

Alternatively, or additionally, the lift 12 may be configured for manually lifting of the docking portion 16 and any docked wheelbarrows 30. The same or similar arrangements as provided in any or all of FIGS. 3-5 may be utilized, such as separately and/or together, but may, alternatively or additionally, include one or more devices for imparting mechanical advantages, such as, but not limited to, counterweights, pulleys, block and tackle, gears, levers, combinations thereof, or the like. For example, without limitation, a counterweight may be used in place of the motor 24 of FIG. 5. As another example, without limitation, the movement redirection component 26 of FIG. 4 may comprise a spring or other component for assisting with moving the docking portion 16 along the track(s) 14.

Figure 6:
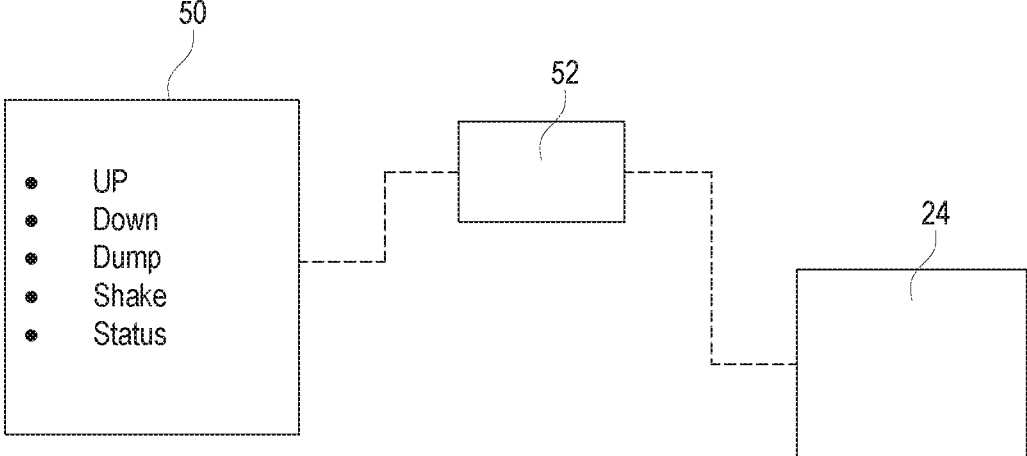
FIG. 6 is a plan view of an exemplary system for operating the lift of FIGS. 1-5.

As illustrated in FIG. 6 the motor(s) 24 may be operated by one or more controllers 52, which may be local to, or remote from, the motors 24 and/or lift 12. The controllers 52 may be in electronic communication with user interfaces 50. The user interfaces 50 may be configured to display information regarding lift 12 status and/or accept commands for lift 12 operation, such as to move the docking portion 16 up or down, to dump a load, to shake the wheelbarrow 30 (e.g., rapid, short distance movement of the docking portion 16 along the tracks 14) such as to dislodge any remaining debris 32, and/or display status of the lift 12 by way of non-limiting example. The user interfaces 50 may comprise electronic displays, depressible buttons, touch screens, combinations thereof, or the like. The user interfaces 50 may be local to, or remote from, the controllers 52, the motors 24 and/or lift 12. The controllers 52 may comprise software for providing and/or accepting commands from the user interfaces 50 and operating the motors 24. The user interfaces 50 may be provided at one or more personal electronic devices, such as smartphone, tablets, or the like.

Figure 8:
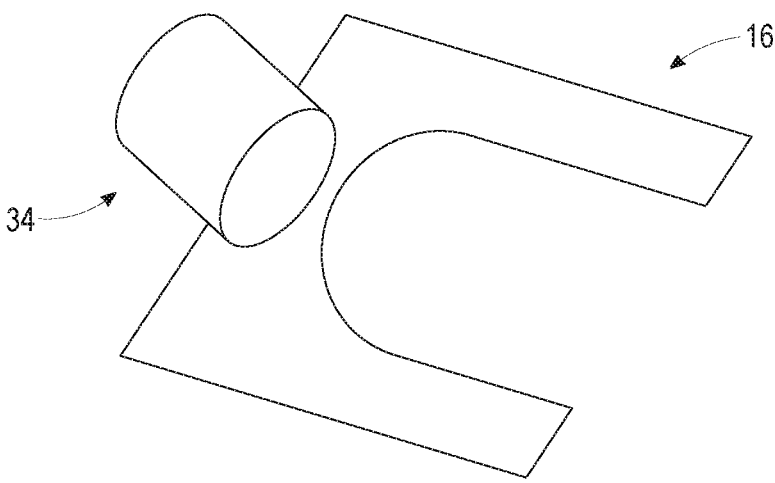
FIG. 8 illustrates a perspective view of another exemplary embodiment of the docking portion of the system and/or lift of FIGS. 1-7 illustrated in isolation.

As illustrated in FIG. 8, the docking portion 16 may comprise one or more debris directors 34. The debris directors 34 may comprise a chute, panel, defector, combinations thereof, or the like configured to direct the debris 32 as they exit the wheelbarrow 30 and enter the dumpster 40. In this fashion, the debris 32 may be directed within the dumpster 40, such as into different compartments or areas thereof. This may be useful, for example without limitation, separating different types of debris 32 and/or directing the debris 32 to less full areas to fill the dumpster 40. The debris directors 34 may be rotatable or moveable to so direct the debris 32. For example, without limitation, the debris director 34 may comprise a chute which is rotatably mounted to the surfaces or platforms of the docking portion 16, such as by way of one or more ball bearings.

Figure 10:
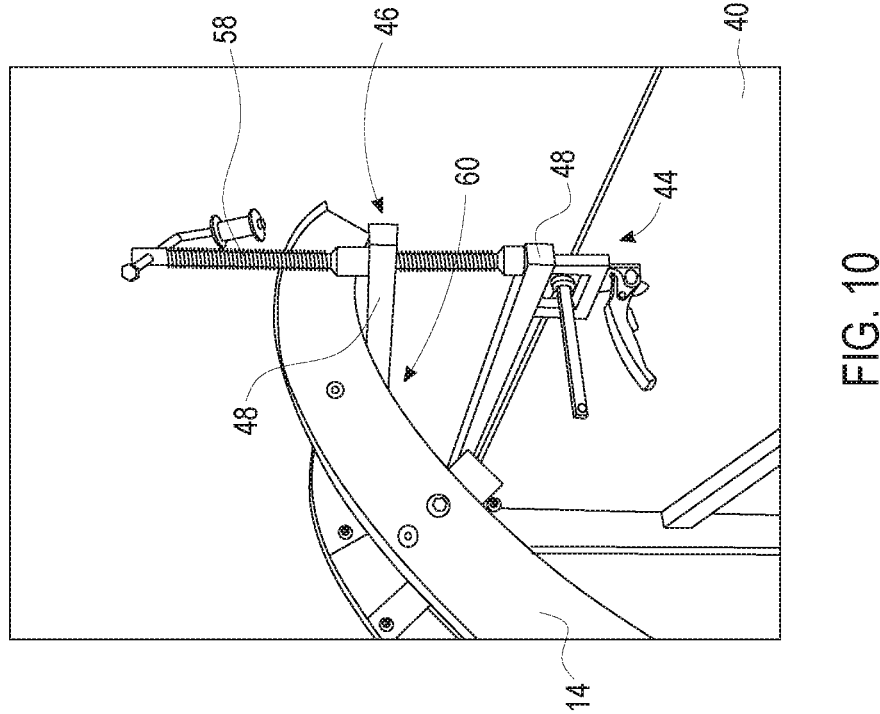
FIG. 10 is a detailed perspective view of Detail A of FIG. 9.
Figure 9:
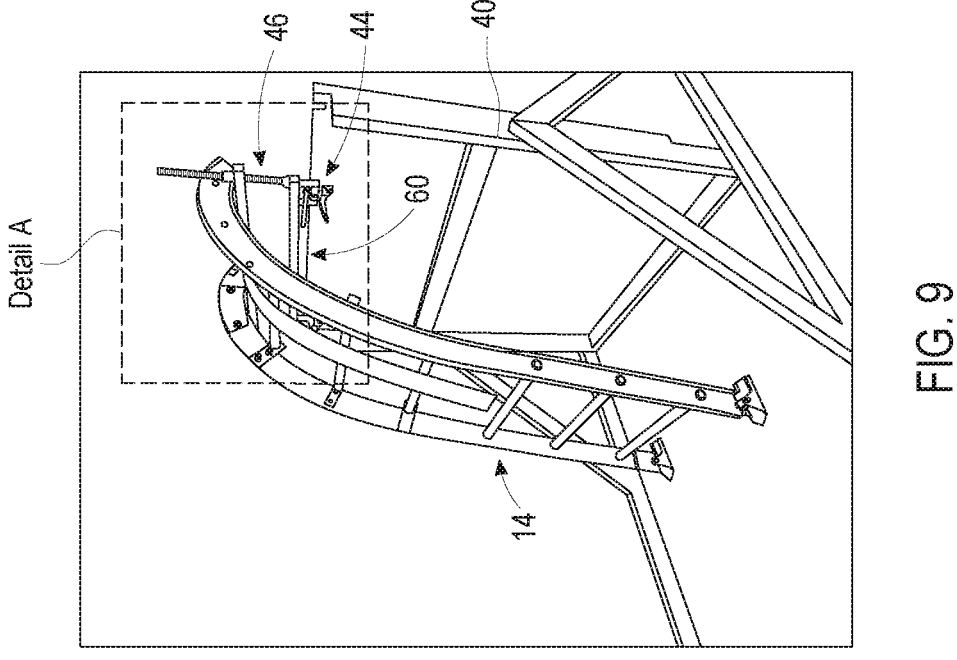
FIG. 9 is a perspective view of another exemplary embodiment of the dumpster deposit system of FIG. 1.
Figure 11:
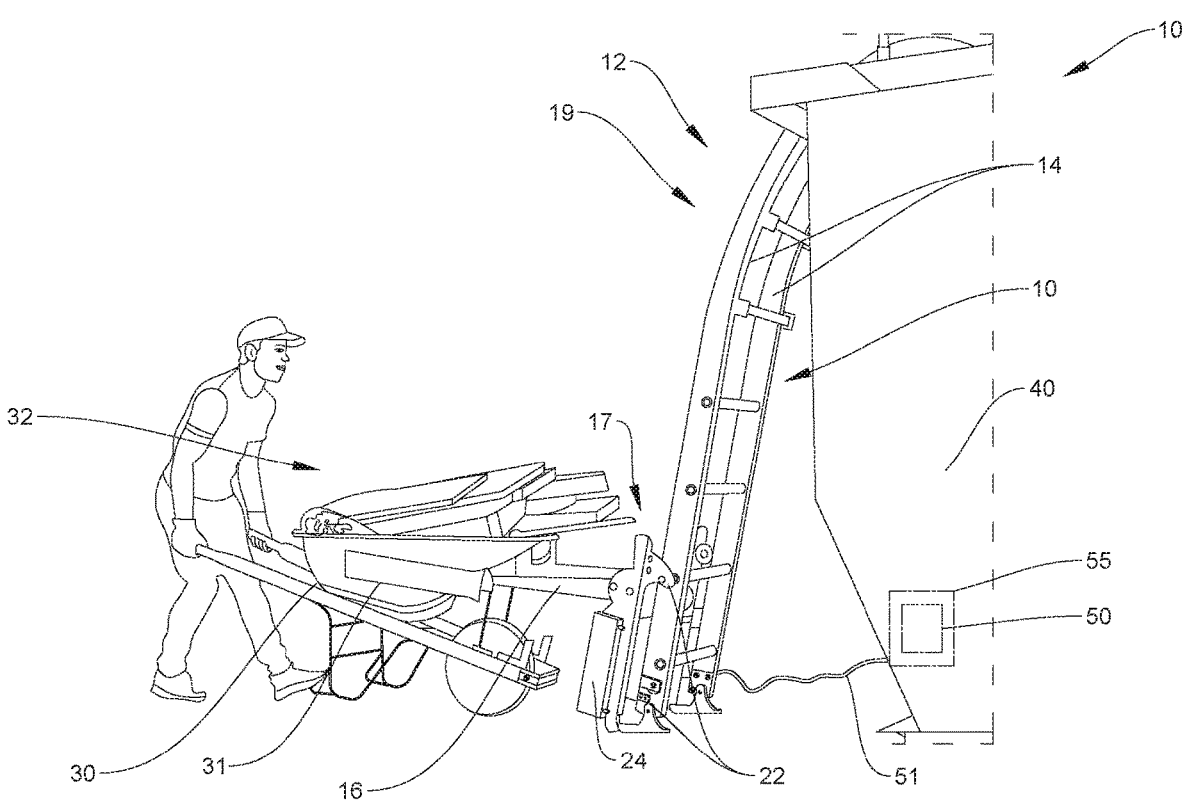
FIG. 11 is a side, perspective view of another exemplary embodiment of the system and/or lift in exemplary use.
Figure 12:
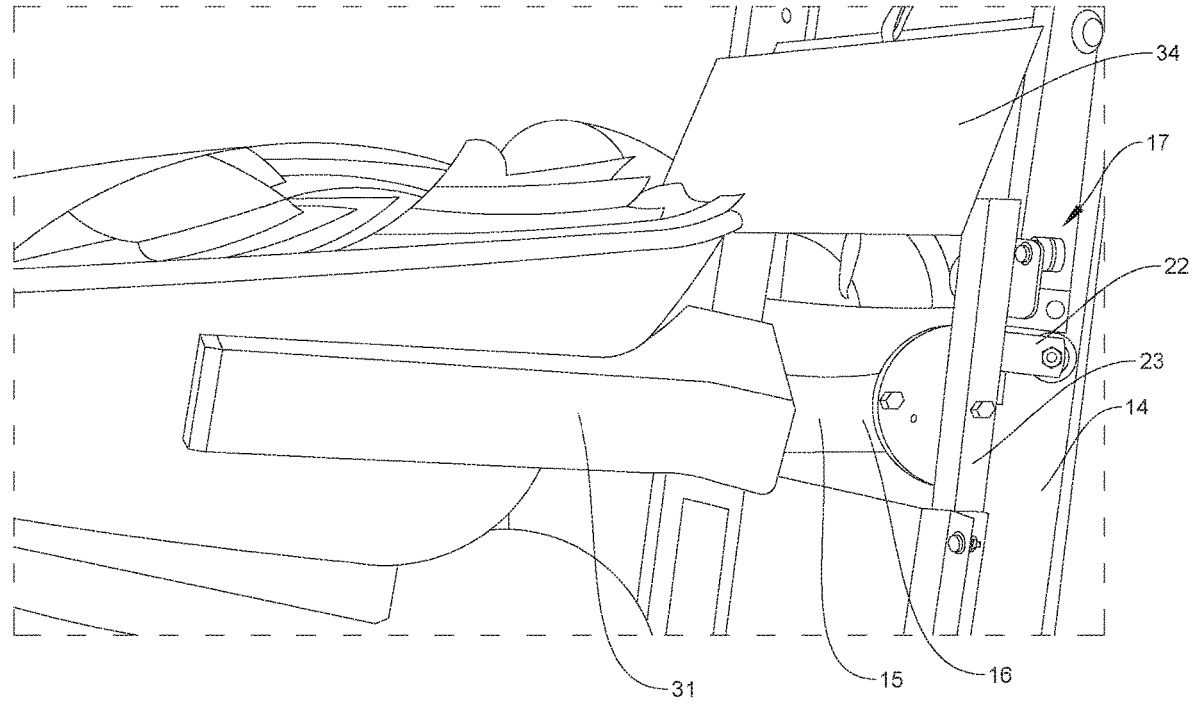
FIG. 12 is a detailed side view of the system and/or lift of FIG. 11.
Figure 13:
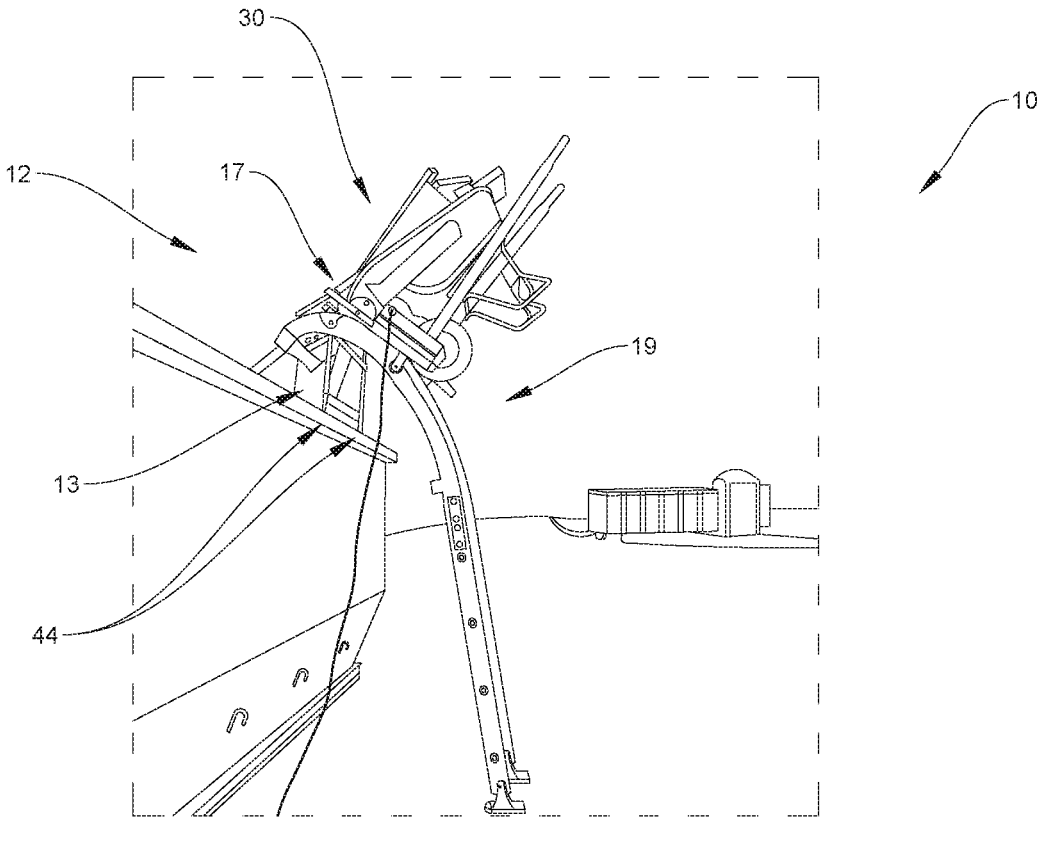
FIG. 13 is a side, perspective view of the system and/or lift of FIG. 11 in further exemplary use.
Figure 14:
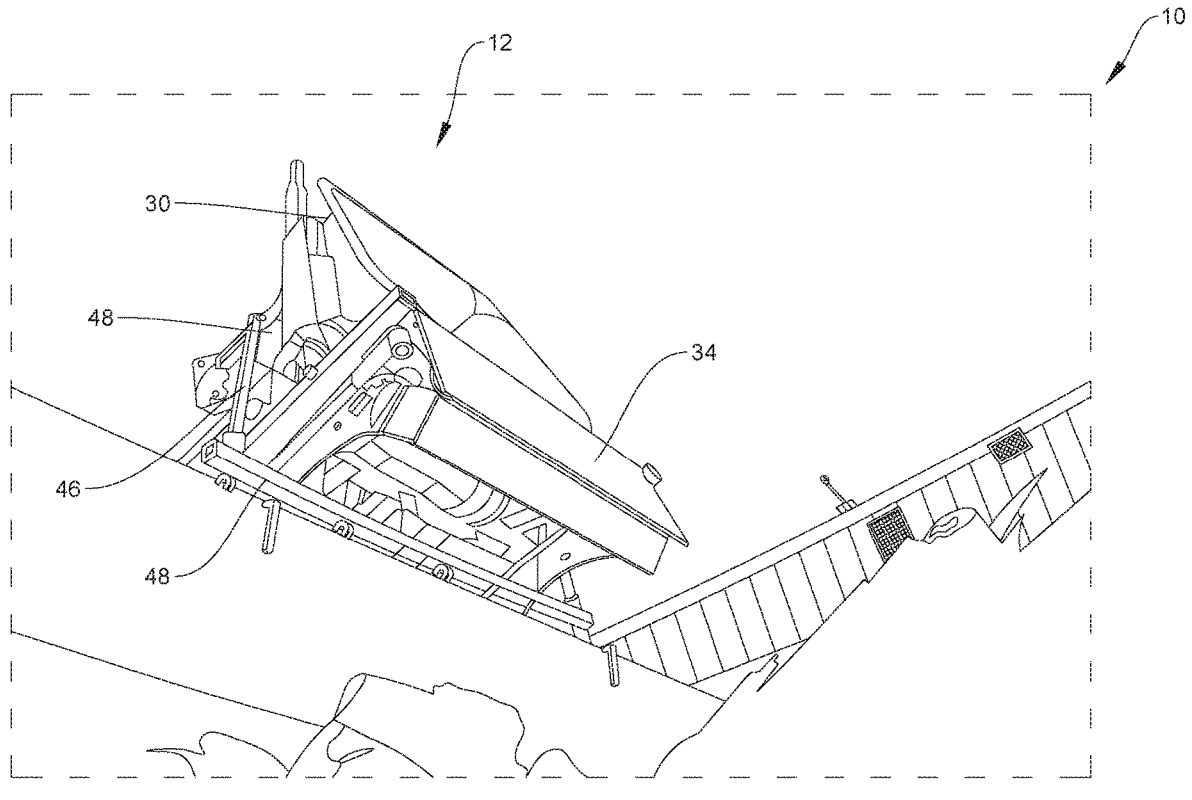
FIG. 14 is a side, perspective view of the system and/or lift of FIG. 11 in further exemplary use.

As illustrated with particular regard to FIG. 9 and FIG. 10, the tracks 14 may be configured to clamp onto or otherwise be secured to a portion of the dumpster 40, such as the upper edge thereof, such as by their shape. For example, without limitation, clamping devices 44 may be provided for assisting in such securement. Alternatively, or additionally, one or more height adjustment mechanisms 46 may be provided to for adjusting the lift 12 to various size dumpsters 40. In exemplary embodiments, without limitation, the height adjustment mechanism(s) 46 may comprise a bracket 48. The bracket 48 may comprise one or more members. The bracket 48 may be connected to the dumpster 40, such as an upper edge of thereof, by way of one or more clamps 44. The bracket 48 may be adjustable by vertical members 58, such as but not limited to, threaded rods, telescoping rods, scissor lifts, jacks, pneumatic lifts, linear actuators, combinations thereof, or the like, which may be configured to provide various amounts of separation between the members of the bracket 48, such as to adjust a height of the track 14. Handles or the like may be provided at, or in association with, the vertical members 58 to effectuate movement. Alternatively, or additionally, controls for the height adjustment mechanism(s) 46 and/or the clamping devices 44 may be provided at the user interface 50 and controlled electronically by the controller 52.

In exemplary embodiments, without limitation, the upper portion of the track 14 may have a decreasing radius, as generally indicated at item 60, such as to allow more efficient operation of the motor(s) 24.

Notably, in FIGS. 9-10 the dumpster 40 is illustrated in partially mocked-up form.

As illustrated with particular regard to at least FIG. 11 through FIG. 14, the wheelbarrow 30 may comprise one or more receptacles 31 configured to receive one or more corresponding members 15 of the docking portion 16 of the wheelbarrow 30. For example, without limitation, one of the receptacles 31 may be provided at each side of the wheelbarrow 30, such as along a debris holding portion (e.g., tub) thereof. The receptacles 31 preferably each define a through-channel. For example, without limitation, the receptacles 31 may each be closed on at least four side and/or open on a front and/or rear side thereof. The receptacles 31 may each be configured to each receive one of two of the corresponding members 15 which extend from, and/or form part of, the docking portion 16 of the lift 12. In this way, the wheelbarrow 30 may be selectively docketed with the lift 12 by manually advancing the wheelbarrow 30 forward so that the members 15 are received in the receptacles 31. Similarly, the wheelbarrow 30 may be selectively undocketed with the lift 12 by manually retracting the wheelbarrow 30 rearward so that the members 15 are removed from the receptacles 31. The receptacles 31 may hold the wheelbarrow 30 while it is lifted.

The lift 12 preferably comprises a vehicle 17 attached to the tracks 14. The vehicle 17 may comprise one or more batteries and/or motors 24, such as for powering the vehicle 17. The motor(s) 24 may be directly or indirectly attached to the wheel(s) 22 of the vehicle 17. Preferably, the wheels 22 engage, such as by inserting into, the tracks 14, such as to prevent, or help prevent, removal of the vehicle 17 from the tracks 14. For example, the wheels 22 may be located on exterior facing surfaces of the tracks 14 and be at least partially recessed in the same. This may limit travel of the vehicle 17 to along the tracks 14.

The motor(s) 24, batteries, and/or controller 52 may be provided locally at the vehicle 17, such as within one or more housings thereof. For example, without limitation, the vehicle 17 may comprise members 23 forming a support structure. Preferably, these members 23 extend along and/or between the tracks 14 when the vehicle 17 is mounted to the tracks 14, though various number and/or arrangement of members 23 may be utilized. The wheels 22 may be connected (directly or indirectly) to the members 23. The chute 34 may be connected (directly or indirectly) to the members 23. The docking portion 16, such as but not necessarily limited to, the member 15, may extend from the member 23. The motor(s) 24, batteries, and/or controller 52, along with any housing(s) for the same, may be attached to such members 23 of the support structure (directly or indirectly).

The vehicle 17 may move along the tracks 14 of the lifting structure 19. The lifting structure 19 may be attached to the dumpster and/or other waste receptacle 40. The lifting structure 19 may comprise an attachment substructure 13 for attaching the lifting structure 19 to the waste receptacle 40 (e.g., dumpster). The attachment substructure 13 may comprise some or all of the components of FIGS. 9-10 (e.g., height adjustment mechanism(s) 46, clamping device(s) 44, bracket(s) 48, and/or vertical member(s) 58).

The lifting structure 19 may include the tracks 14, the cross support(s) 21, and/or the attachment substructure 13.

The chute 34 may comprise one or more panels. The panel(s) may be moveably attached to the vehicle 17 and/or may be tethered thereto.

A remote control 55 or other device for operating the vehicle 17 may be in wired 51 and/or wireless connection with the vehicle 17, such as the controller 54 and/or motor(s) 24 thereof. In this way, operation of the vehicle 17 may be controlled from a distance, such as for safety reasons. The remote control 55 may comprise, provided, and/or form, at least in part, the controller 52 and/or the user interface 50, such as by way of physical buttons, touch screen, joystick and/or other human-machine-interface components located at the same.

Figure 15:
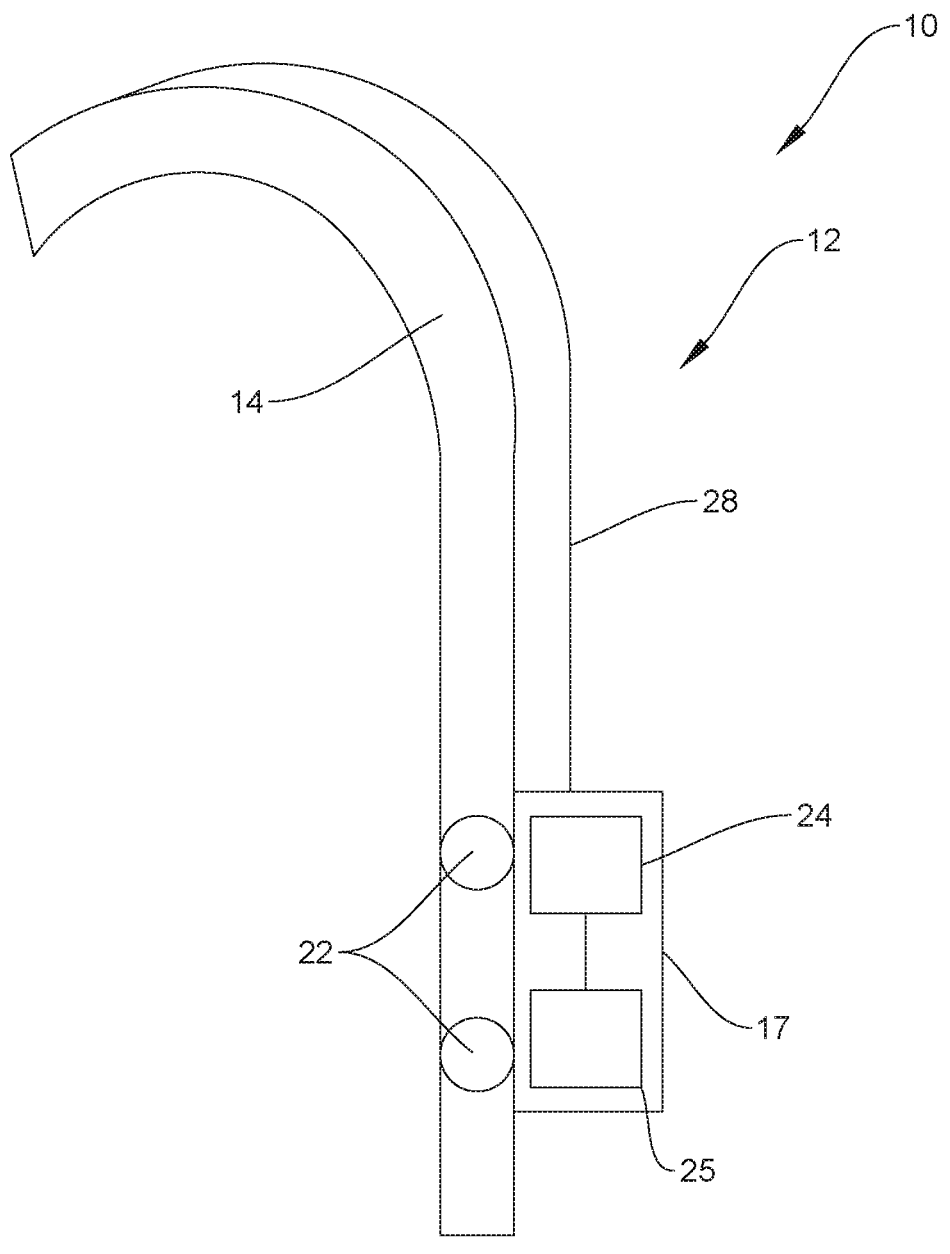
FIG. 15 is a schematic side view of an exemplary embodiment of the system and/or lift of FIGS. 1-14.

As illustrated with particular regard to at least FIG. 15, the vehicle 17, in exemplary embodiments, without limitation, may be conveyed along the tracks 14 by operation of an onboard motor(s) 24. A flexible linkage 28, such as but not necessarily limited to, a cable may be attached to an upper portion of the tracks 14, such as a distal end thereof and/or a final cross support 21, by way of non-limiting example. Alternatively, or additionally, the flexible linkage 28 may be connected to the attachment substructure 13.

The motor 24 and/or a redirection component 26 may act as and/or be part of a winch, by way of non-limiting example. The motor 24 and/or redirection component 26 may, when operated, wind the flexible linkage 28 about the redirection component 26 (e.g., spool) to cause the vehicle 17 to advance along the tracks 14. The tracks 14 and/or wheels 22 may guide progress of the vehicle 17. The motor(s) 24 may be powered by one or more onboard batteries 25 and/or other power supplies. Alternatively, or additionally, the motor(s) 24 are powered by electrically connected, but remote, power supplies (e.g., battery, utility power supply, generator, motor, fuel source, fuel cell, solar panel, combinations thereof, or the like). The motor 24, batteries 25, and/or wheels 22 may be interconnected by one or more members 23 and/or housing panels, which may form, at least in part, a support structure for the vehicle 17, in exemplary embodiments without limitation.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. An apparatus for docking with, lifting, and depositing debris from, a wheelbarrow into a dumpster, said apparatus comprising:

a pair of tracks, a lower portion of said pair of tracks extending longitudinally in a primarily vertical direction and an upper portion of said pair of tracks extending longitudinally rearward in a curve shape to hook over an upper opening of the dumpster when said apparatus is installed at said dumpster; and a vehicle comprising wheels, each engaging one of said pair of tracks, a docking portion configured to receive, and frictionally engage upon lifting, a portion of the wheelbarrow, and a motor configured to, when activated, move the vehicle along the pair of tracks.

2. The apparatus of claim 1 wherein:

said docking portion of said vehicle comprises a first member and a second member, each of which extend longitudinally in a direction at least primarily normal to an adjacent portion of a longitudinal axis of said pair of tracks;

said first member and said second member are configured to be received within a first receptacle and a second receptacle, respectively, at the wheelbarrow; and said first and second receptacle extend longitudinally along a longitudinal axis of the wheelbarrow such that said wheelbarrow is docked and undocked at said docking portion by forward and rearward manual advancement and retraction of said wheelbarrow in a direction at least primarily aligned with the longitudinal axis of the wheelbarrow.

3. The apparatus of claim 1 wherein:

said docking portion of said vehicle comprises an aperture configured to receive and frictionally engage a portion of the wheelbarrow;

the docking portion comprises a platform;

the aperture extends to a forward edge of the platform; and the aperture is sized to accommodate a lower portion of a tray of the wheelbarrow and not an upper portion of the tray.

4. The apparatus of claim 3 further comprising:

the docking portion comprises support members having a proximal end extending from a forward portion of the platform at a downward, angular direction towards the pair of tracks, wherein each of a first set of the wheels is located at a rear portion of the platform and each of a second set of the wheels is located at a distal end of a respective one of the support members.

5. The apparatus of claim 1 further comprising:

cross supports, spaced apart from one another and extending between the pair of tracks.

6. The apparatus of claim 1 further comprising:

a debris director located at a rear portion of the docking portion.

7. The apparatus of claim 6 further comprising:

the debris director comprises a pivoting chute.

8. The apparatus of claim 1 further comprising:

a flexible linkage extending between a lifting structure of the apparatus comprising the pair of tracks and said vehicle, said flexible linkage being engaged by said motor, at least during operation of said motor, to cause movement of the vehicle along said pair of tracks.

9. The apparatus of claim 1 wherein:

the motor is directly connected to at least one of the wheels.

10. The apparatus of claim 8 further comprising:

a redirection device, wherein the flexible linkage engages the redirection device and the motor is configured to, when operated, drive the redirection device as part of a motorized winch to cause the movement of the vehicle along said pair of tracks.

11. The apparatus of claim 1 further comprising:

a controller in electronic connectivity with the motor; and a user interface in electronic connectivity with the controller.

12. The apparatus of claim 11 wherein:

the controller comprises software instructions, which when executed, configure the controller to:

generate, at the user interface, prompts for: moving the vehicle upward along the pair of tracks, moving the vehicle downward along the pair of tracks, dumping contents of the wheelbarrow into the dumpster, and shaking the wheelbarrow; and receive data from the user interface indicating user selection of one of the prompts, and in response, command the motor to operate in accordance with the user selection.

13. The apparatus of claim 1 further comprising:

an attachment substructure provided at the upper portion of the pair of tracks for selectively mounting the pair of tracks to an upper portion of the dumpster, the attachment substructure comprising one or more members, one or more height adjustment mechanisms, and one or more clamping devices for engaging an upper edge of the dumpster, where said members and one or more height adjustment mechanisms support at least the upper portion of the tracks.

14. A method for docking with, lifting, and depositing debris from, a wheelbarrow into a dumpster using the apparatus of claim 1, said method comprising:

loading debris into the wheelbarrow;

advancing the wheelbarrow to the apparatus to engage with the docking portion of the vehicle; and receiving, at a controller for the vehicle and from a remote control presenting a user interface, data indicating user selection of one of options provided at the user interface, and in response, commanding the motor of the vehicle to operate in accordance with the user selection by activating the motor and thereby causing movement of the vehicle along the pair of tracks.

15. An apparatus for docking with, lifting, and depositing debris from, a wheelbarrow into a dumpster, said apparatus comprising:

a pair of tracks, a lower portion of said pair of tracks extending longitudinally in a primarily vertical direction and an upper portion of said pair of tracks extending longitudinally rearward in a curve shape to hook over an upper opening of the dumpster when said apparatus is installed at said dumpster; and a vehicle comprising wheels, each engaging one of said pair of tracks, and a docking portion configured to receive, and frictionally engage upon lifting, a portion of the wheelbarrow, said docking portion comprising a first member and a second member, each of which extend longitudinally in a direction at least primarily normal to an adjacent portion of a longitudinal axis of said pair of tracks and are configured to be received within a first receptacle and a second receptacle, respectively, at the wheelbarrow, which extend longi-
tudinally along a longitudinal axis of the wheelbarrow
such that said wheelbarrow is docked and undocked at
said docking portion by forward and rearward manual
advancement and retraction of said wheelbarrow in a
direction at least primarily aligned with the longitudinal
axis of the wheelbarrow.

16. An apparatus for docking with, lifting, and depositing
debris from, a wheelbarrow into a dumpster, said apparatus
comprising:
a pair of tracks, a lower portion of said pair of tracks
    extending longitudinally in a primarily vertical direc-
    tion and an upper portion of said pair of tracks extend-
    ing longitudinally rearward in a curve shape to hook
    over an upper opening of the dumpster when said
apparatus is installed at said dumpster;
  a vehicle comprising wheels, each engaging one of said
    pair of tracks, and a docking portion configured to
    receive, and frictionally engage upon lifting, a portion
    of the wheelbarrow; and
an attachment substructure provided at the upper portion
    of the pair of tracks for selectively mounting the pair of
    tracks to an upper portion of the dumpster, said attach-
    ment substructure comprising one or more members,
    one or more height adjustment mechanisms, and one or
more clamping devices for engaging an upper edge of
    the dumpster.

*   *   *   *   *